(12) United States Patent
Rao et al.

(10) Patent No.: US 12,346,714 B2
(45) Date of Patent: Jul. 1, 2025

(54) SOFTWARE-DEFINED MULTI-LINGUAL TYPEWRITTEN CHARACTERS

(71) Applicant: Dell Products L.P., Round Rock, TX (US)

(72) Inventors: Sheshadri P R Rao, Bengaluru (IN); Susan Jiji, Bangalore (IN); Veena R, Bangalore (IN); Sucheta Roy, Bangalore (IN); Sanjay V Arbatti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 335 days.

(21) Appl. No.: 17/859,792

(22) Filed: Jul. 7, 2022

(65) Prior Publication Data
US 2024/0012662 A1    Jan. 11, 2024

(51) Int. Cl.
*G06F 9/451* (2018.01)
*G06F 16/2458* (2019.01)

(52) U.S. Cl.
CPC .......... *G06F 9/454* (2018.02); *G06F 16/2458* (2019.01)

(58) Field of Classification Search
USPC ................................................ 704/7–10, 257
See application file for complete search history.

(56) References Cited

U.S. PATENT DOCUMENTS

| | | | |
|---|---|---|---|
| 2004/0230912 A1* | 11/2004 | Clow | G06F 40/58 715/773 |
| 2004/0260536 A1* | 12/2004 | Hwang | G06F 40/263 704/9 |
| 2013/0342467 A1* | 12/2013 | Cresp | G06F 3/0238 345/172 |
| 2014/0035823 A1* | 2/2014 | Khoe | G06F 3/04886 345/171 |
| 2017/0103130 A1 | 4/2017 | Roy et al. | |
| 2018/0217749 A1* | 8/2018 | Alsharif | G06F 40/263 |
| 2018/0239743 A1* | 8/2018 | Satpute | G06F 40/129 |
| 2021/0173494 A1 | 6/2021 | Basu et al. | |

\* cited by examiner

*Primary Examiner* — Leonard Saint-Cyr
(74) *Attorney, Agent, or Firm* — Larson Newman, LLP

(57) ABSTRACT

Software programming provides multi-lingual capabilities for typewritten characters. An information handling system may be programmed to identify any language-specific character typed in any human, natural language. The information handling system presents a menu of supported languages, and a user may select her desired language of use. As the user then types on a keyboard, the information handling system receives scancodes. The information handling system accesses a comprehensive, universal database storing language-specific characters used in many languages. The information handling system uses the database to identify which key, and thus which language-specific character, was depressed, according to the user's desired language of use. Should the information handling system be shared by multiple users, any of the users may switch the language of use and type using the corresponding language-specific characters.

16 Claims, 9 Drawing Sheets

SOFTWARE-DEFINED MULTI-LINGUAL TYPEWRITTEN CHARACTERS

FIELD OF THE DISCLOSURE

This disclosure generally relates to information handling systems, and more particularly relates to software-driven overlay display of multi-lingual characters.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

Software programming provides multi-lingual capabilities for typewritten characters. An information handling system may be programmed to identify any language-specific character typed in any human, natural language. The information handling system presents a menu of supported languages, and a user may select her desired language of use. As the user then types on a keyboard, the information handling system receives scancodes. The information handling system accesses a comprehensive, universal database storing language-specific characters used in many languages. The information handling system uses the database to identify which key, and thus which language-specific character, was depressed, according to the user's desired language of use. Should the information handling system be shared by multiple users, any of the users may switch the language of use and type using the corresponding language-specific characters.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
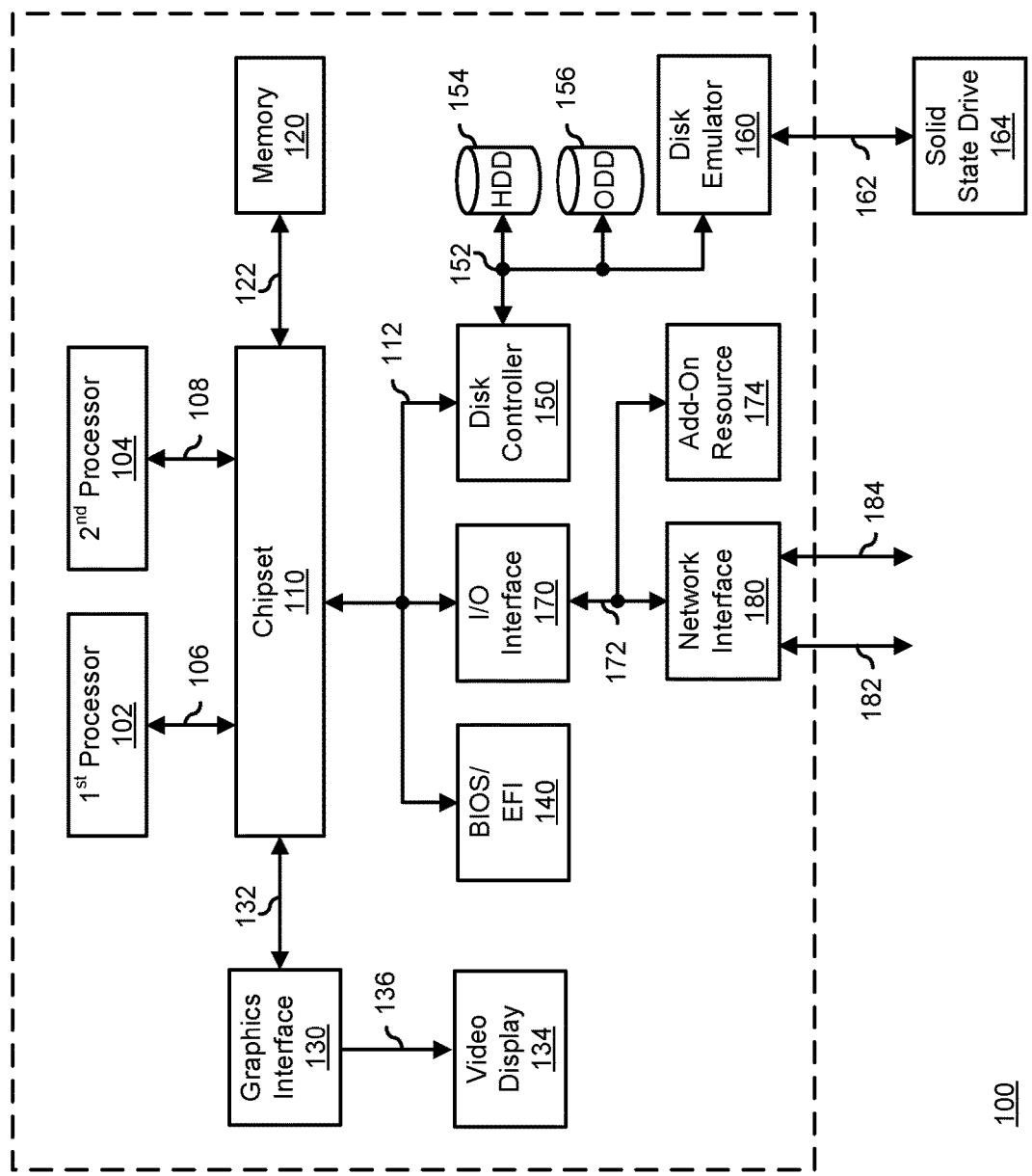
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, and a network interface device 180. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

The information handling system 100 may include a baseboard management controller (BMC). The BMC is connected to multiple elements of information handling system 100 via one or more management interface to provide out of band monitoring, maintenance, and control of the elements of the information handling system. As such, BMC represents a processing device different from processors 102 and 104, which provides various management functions for information handling system 100. In an embodiment, BMC may be responsible for granting access to a remote management system that may establish control of the elements to implement power management, cooling management, storage management, and the like. The BMC may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC includes a network interface that can be connected to a remote management system to receive firmware updates, as needed or desired. Here BMC receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC utilizes various protocols and application programming interfaces (APIs) to direct and control the processes for monitoring and maintaining the system firmware. An example of a protocol or API for monitoring and maintaining the system firmware includes a graphical user interface (GUI) associated with BMC, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC is included on a main circuit board (such as a baseboard, a motherboard, or any combination thereof) of information handling system 100, or is integrated into another element of the information handling system such as chipset 110, or another suitable element, as needed or desired. As such, BMC can be part of an integrated circuit or a chip set within information handling system 100. BMC may operate on a separate power plane from other resources in information handling system 100. Thus BMC can communicate with the remote management system via network interface or the BMC can communicate with the external mobile device using its own transceiver circuitry while the resources or elements of information handling system 100 are powered off or at least in low power mode. Here, information can be sent from the remote management system or external mobile device to BMC and the information can be stored in a RAM or NV-RAM associated with the BMC. Information stored in the RAM may be lost after power-down of the power plane for BMC, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Figure 2:
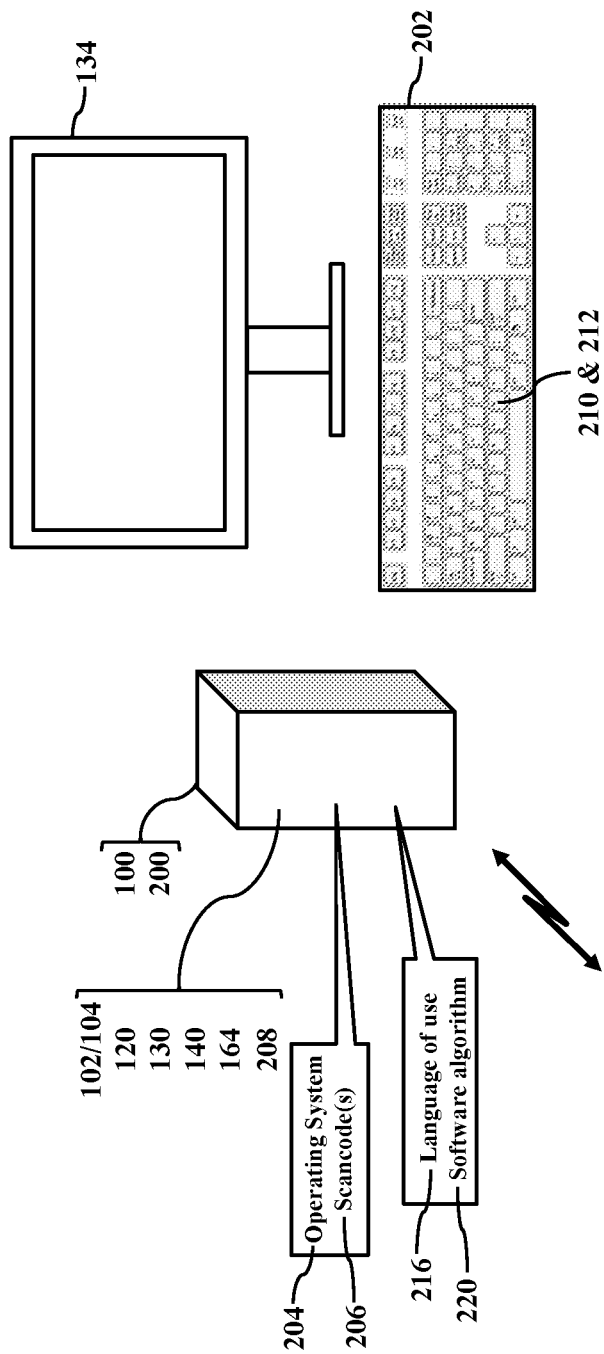
FIG. 2 further illustrates the information handling system, according to exemplary embodiments.

FIG. 2 further illustrates the information handling system 100 as a desktop computer 200. The information handling system 100, however, may also be embodied as a smartphone, a laptop computer, a server, a tablet computer, or any other processor-controlled device. The desktop computer 200 interfaces with a keyboard 202 and with the video display 134. The software operating system (OS) 204 is stored by the memory device 120 such as the non-volatile RAM 140, the solid-state drive 164, and/or other non-volatile ROM, flash, or magnetic/optical hard drive, as explained and illustrated with reference to FIG. 1. As a user types on the keyboard 202, the keyboard 202 sends scancodes 206 to the desktop computer 200. The scancodes 206 may be conveyed via a wired connection, or a wireless connection, to a keyboard controller 208 operating as an internal component within the desktop computer 200. Each scancode 206 is a unique data identifier representing a key 210 that was depressed by the user's finger.

The keyboard controller 208 interprets the scancode 206 to identify the key 210 depressed by the user's finger. The keyboard controller 208 may also identify a character 212 that corresponds to the key 210. So, as the user types on the keyboard 202, the keyboard controller 208 cooperates with the processors 102 and 104, the memory 120, the operating system 204, and other hardware and software resources to interpret the user's keystrokes as inputs. The keyboard controller 208 may also cooperate with the graphics adapter 130 to display the user's keystroke, such as the character 212 that corresponds to the key 210, on the video display 134. The user may thus type inputs and commands, for example to access a communications network 214 such as the public Internet and/or a virtual private network.

FIG. 2 also illustrates language selection. The information handling system 100, such as the desktop computer 200, may be used throughout the world. The desktop computer 200 may be shipped for many different global markets, and operated by users in many different written/typed human, natural languages. The information handling system 100 may thus have features and options for selecting a user's desired or preferred typed language 216 of use. After the user specifies the language 216 of use, the desktop computer 200 stores and executes a language-specific keyboard software algorithm 220 that interprets the user's keystroke inputs into the user's desired language 216 of use. That is, the language-specific keyboard software algorithm 220 converts the scancode 206 (representing the depressed key 210) into the corresponding language-specific character 212.

The language-specific keyboard software algorithm 220, for example, assigns the language-specific character 212 to a specific key 210 (represented by its corresponding scancode 206) in the keyboard 202. The user may thus tactilely type in her chosen language 216 of use, with each mechanical/electronic/capacitive key 210 assigned to its corresponding language-specific character 212. The language-specific keyboard software algorithm 220 may even assign multiple, nearly simultaneously depressed keys 210 to the language-specific character 212. The language-specific keyboard software algorithm 220 may thus change or modify a software command or function associated with any key 210.

The user may thus type on the keyboard 202 in her chosen language 216 of use. Particular keys 210 on the keyboard 202 may be assigned to different, language-specific characters 212, depending on the user's language 216 of use. The user need only specify her typed language 216 of use, and the language-specific keyboard software algorithm 220 modifies the software assignments/functions of the scancodes 206 to the corresponding language-specific characters 212, for example independent of the operating system 204. A common or standard keyboard 202 (such as a full-size, so-called IBM 104/105 key layout) may thus be shipped worldwide for use in any typewritten language, for example regardless of the languages supported by the operating system 204. The language-specific keyboard software algorithm 220 may thus be used to modify the keys 210 to their corresponding language-specific characters 212 in the user's language 216 of use, even if the user's language 216 of use is not supported by the operating system 204. Exemplary embodiments thus provide software-defined, multi-lingual assignments for the keys 210 of the keyboard 202.

Figure 3:
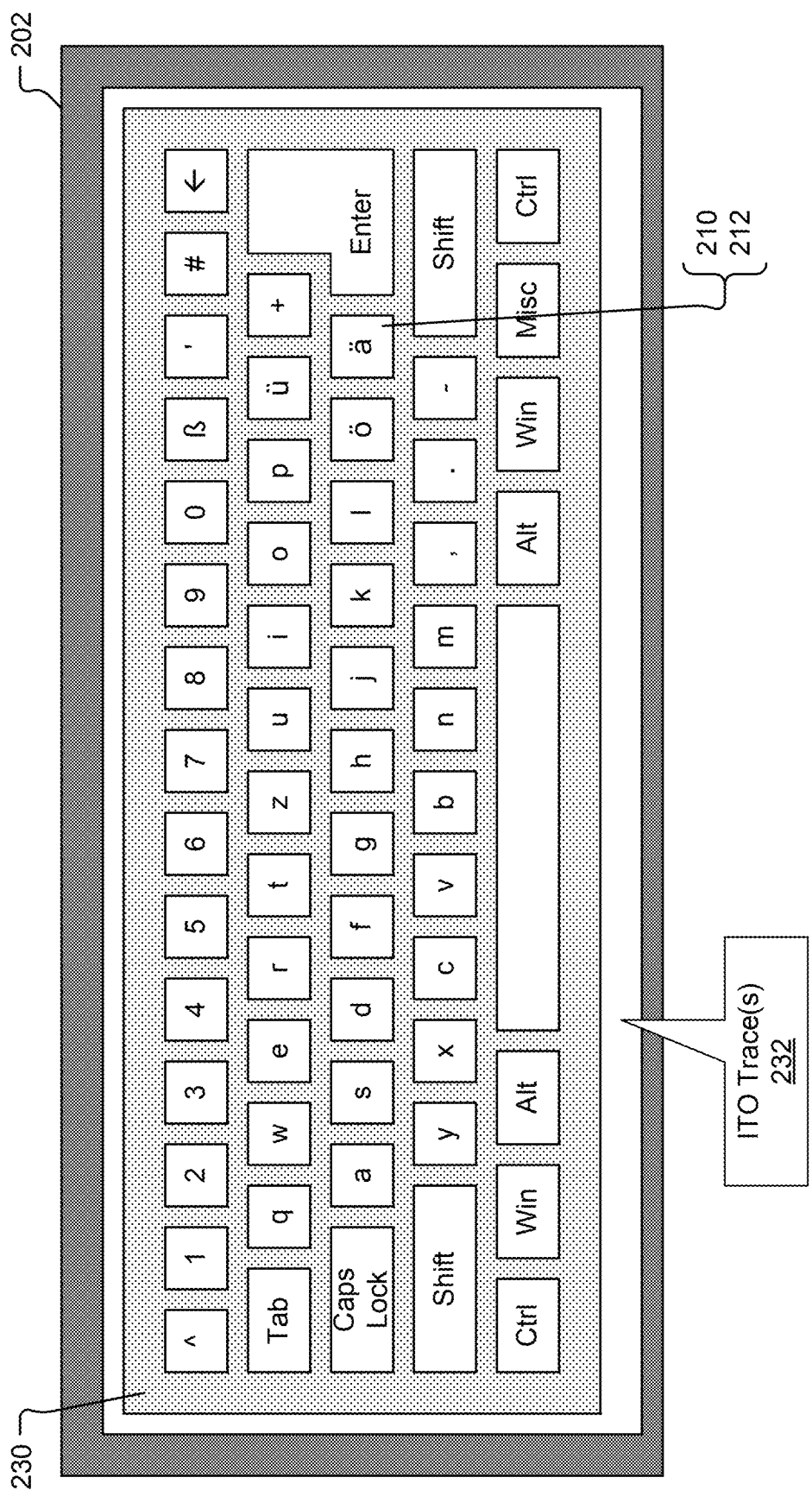
FIG. 3 illustrates an illuminated keyboard overlay, according to exemplary embodiments.

FIG. 3 illustrates an illuminated keyboard overlay 230, according to exemplary embodiments. Even though exemplary embodiments may dynamically change the language-specific characters 212 assigned to the keys 210 of the keyboard 202 (according to the user's language 216 of use), the keyboard overlay 230 may be helpful. The keyboard overlay 230 is placed over, affixed to, and/or laid onto the keys 210 of the keyboard 202. The keyboard overlay 230 may be designed for uni- or single-lingual display of a language-specific character 212 assigned to the key 210. The keyboard overlay 230, in other words, may be dedicated and designed for a specific language. The keyboard overlay 230, however, may be designed for multi-lingual display of many different language-specific characters 212 assigned to the key 210.

The keyboard overlay 230 may be designed to overlay on top of the keyboard 202, with the design of the keyboard overlay 230 tailored to the language-specific characters 212 of the language 216 of use. FIG. 3, for example, illustrates a German-language design for the keyboard overlay 230. Some of the keys 210 indicate German language-specific characters 212 (corresponding to the German language 216 of use). The keyboard overlay 230, however, may also have features that indicate Arabic, Chinese, and other language-specific characters 212. The keyboard overlay 230 thus allows the single, standard or generic keyboard 202 to be made, shipped, and sold throughout the world. The keyboard overlay 230 overlays the keyboard 202 and provides multi-lingual typing capabilities.

The keyboard overlay 230 may also illuminate the language-specific characters 212. The keyboard overlay 230 may have electronic illuminating components (such as LEDs) that light or illuminate to indicate any one, more, or all of the language-specific characters 212. The illuminated keyboard overlay 230 may thus electronically adapt to the user's desired language 216 of use specified during an execution of the operating system 204 (illustrated in FIG. 2). As an example, an illuminated design of the keyboard overlay 230 may preferably include flexible (such as silicone) keys and one or more Indium Tin Oxide (or "ITO") layers. The illuminated keyboard overlay 230 may thus have multiple, and different, ITO traces 232. Each ITO trace 232, for example, may correspond to, and/or be assigned to, a particular key 210 and/or a particular language-specific character 212. The illuminated keyboard overlay 230 may thus be commanded or instructed to illuminate and/or to activate the specific keys 210, and/or the language-specific characters 212, depressed in each typed language. Because not all languages have an equal number of characters (keys 210), exemplary embodiments may not illuminate those keys 210 and/or ITO-traces 232 that are not populated with language-specific characters 212. The illuminated keyboard overlay 230, however, may have any construction, and exemplary embodiments may be adapted to any keyboard 202 and/or to any keyboard overlay 230.

Figure 4:
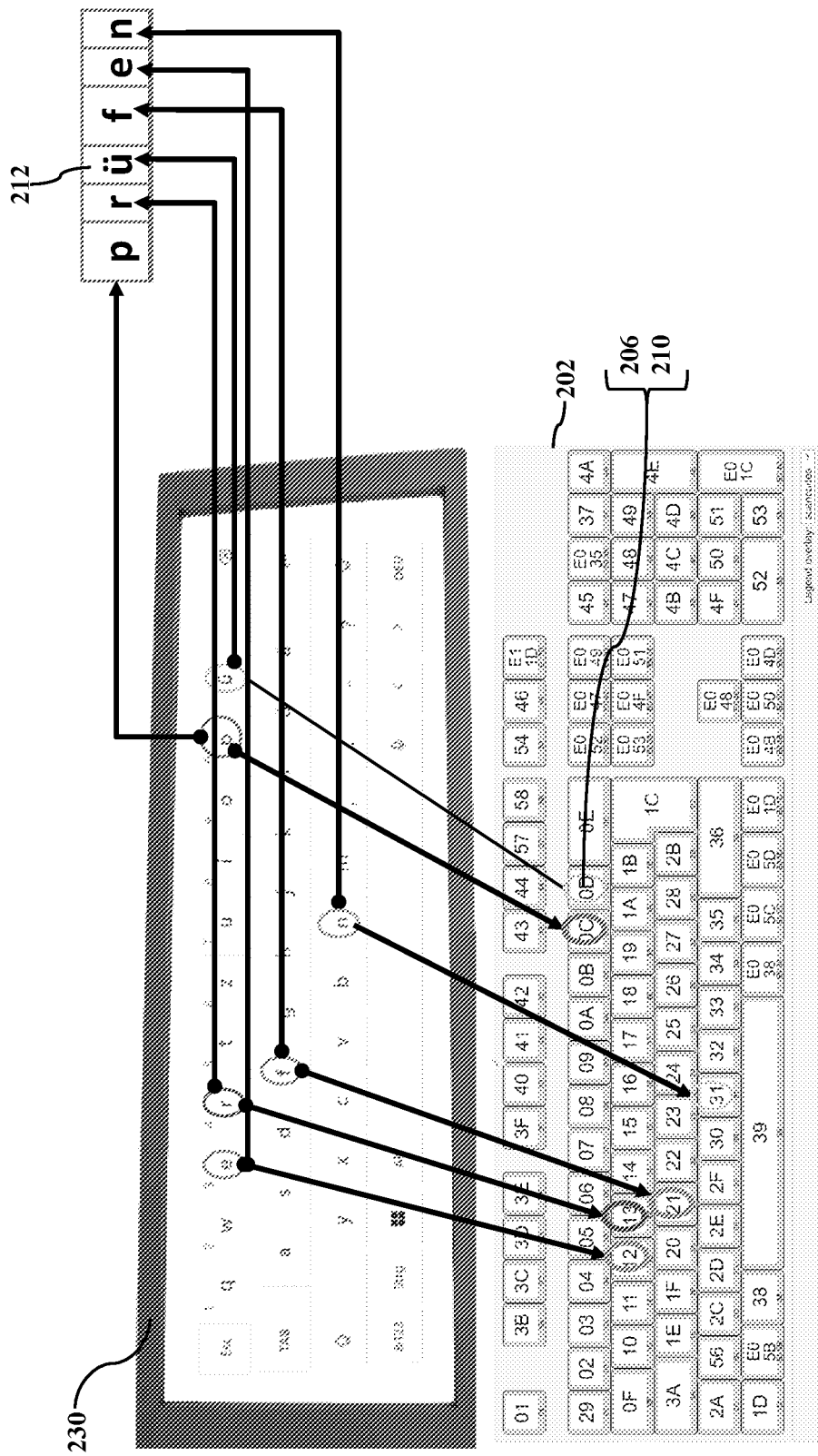
FIG. 4 illustrates software-driven language-specific characters, according to exemplary embodiments.

FIG. 4 further illustrates software-driven language-specific characters 212, according to exemplary embodiments. Again, suppose that the user's typed language 216 of use is German. The written German language includes specialized characters (such as "ü" and "ß"). The language-specific keyboard software algorithm 220 (illustrated in FIG. 2) may thus interpret and adapt the keys 210, and/or their corresponding scancodes 206, to the language-specific characters 212 associated with the typed/written German language. As a simple example, the German word "prüfen" is difficult to enter or type using a common QWERTY English keyboard 202. FIG. 4 thus illustrates the German language-specific keyboard overlay 230.

When the user selects the German language as her desired language 216 of use, the language-specific keyboard software algorithm 220 modifies the functions or assignments of at least some of the keys 210 to correspond to the German language-specific characters 212. The language-specific keyboard software algorithm 220 may also change or adapt any or all of characters illuminated or displayed by the keyboard overlay 230, based on the typed German language. The language-specific keyboard software algorithm 220 alters the character assignments of the keys 210 and/or the scancodes 206, based on the language 216 of use. The user need not memorize difficult/complicated multiple keystroke inputs, as in some conventional solutions. The user need not physically connect a German keyboard, as in other conventional solutions. The user need only adjust her typing pattern based on the German language-specific characters 212 associated with the keys 210.

Figure 5:
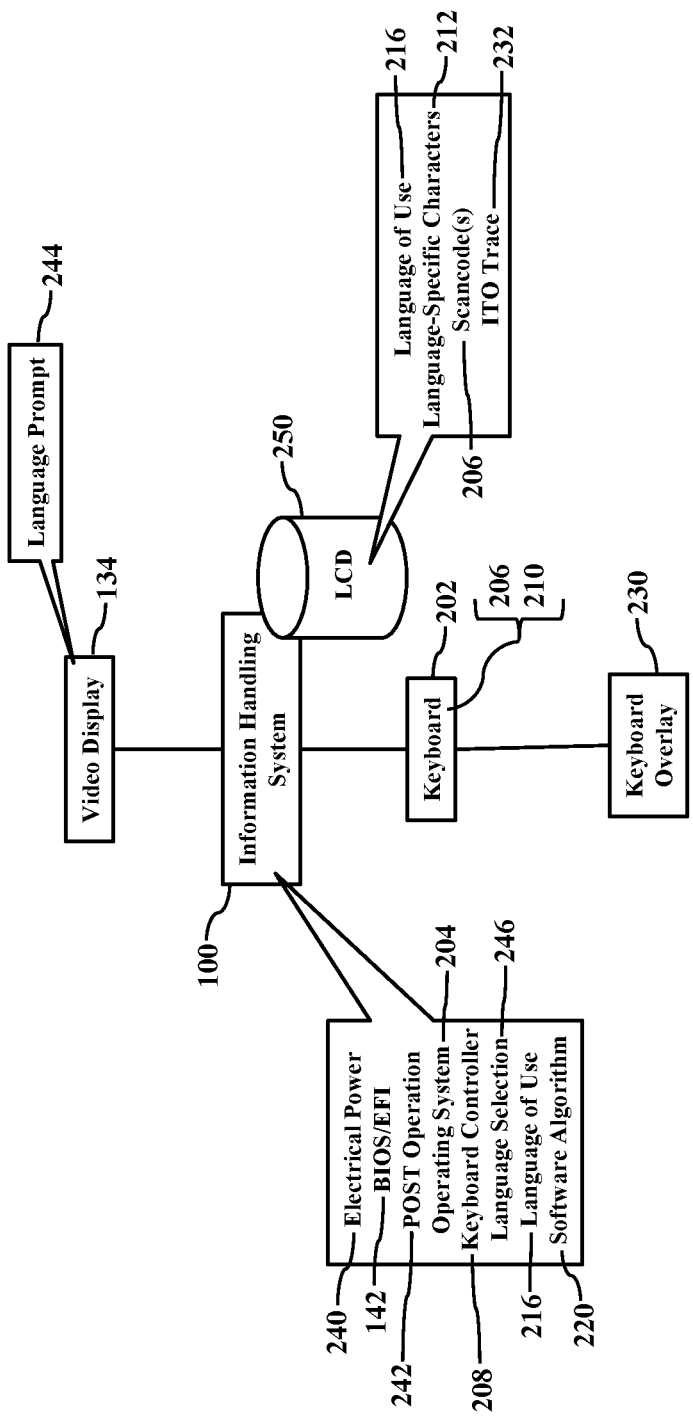
FIGS. 5-7 illustrate software-driven language implementation, according to exemplary embodiments.
Figure 6:
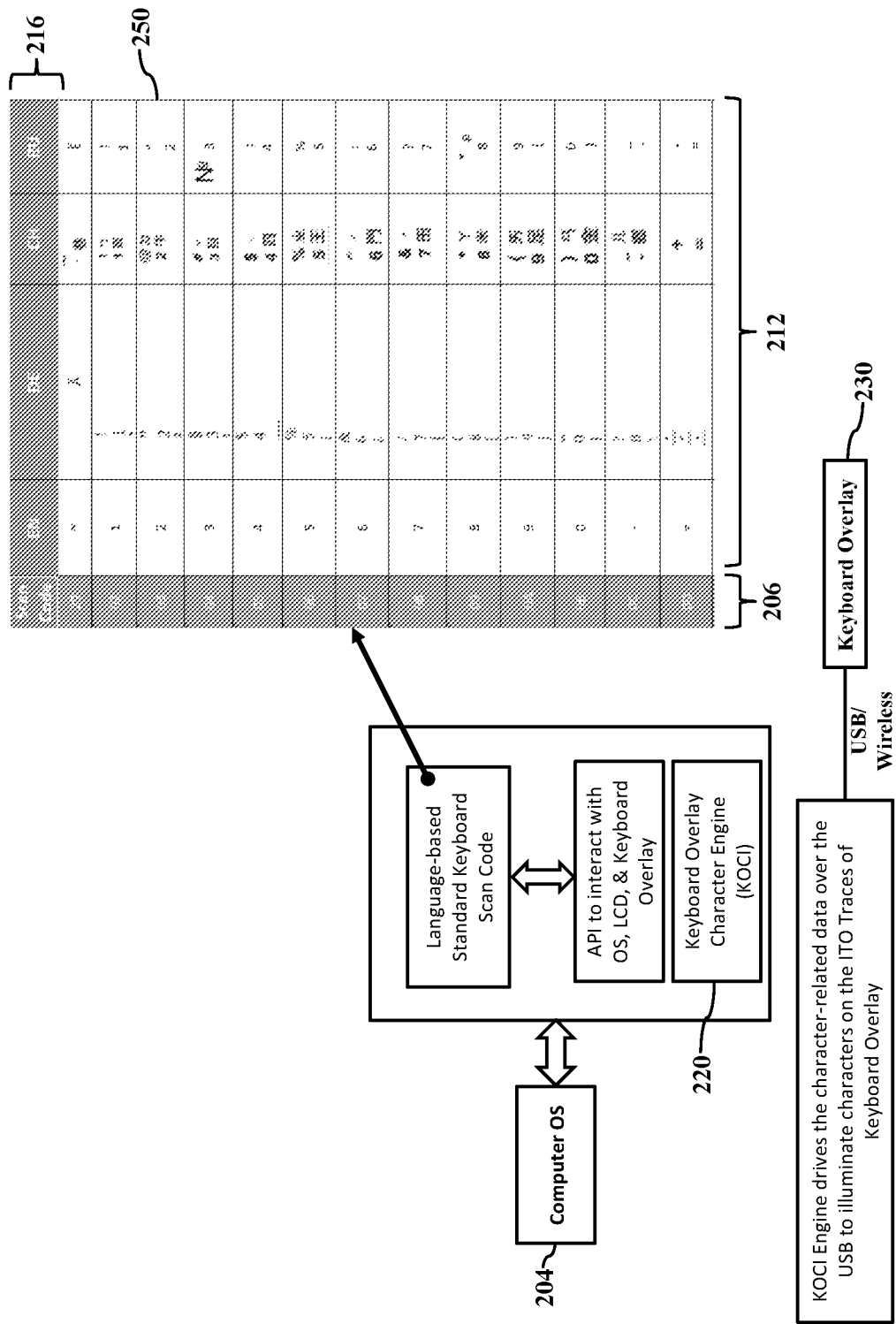
Figure 7:
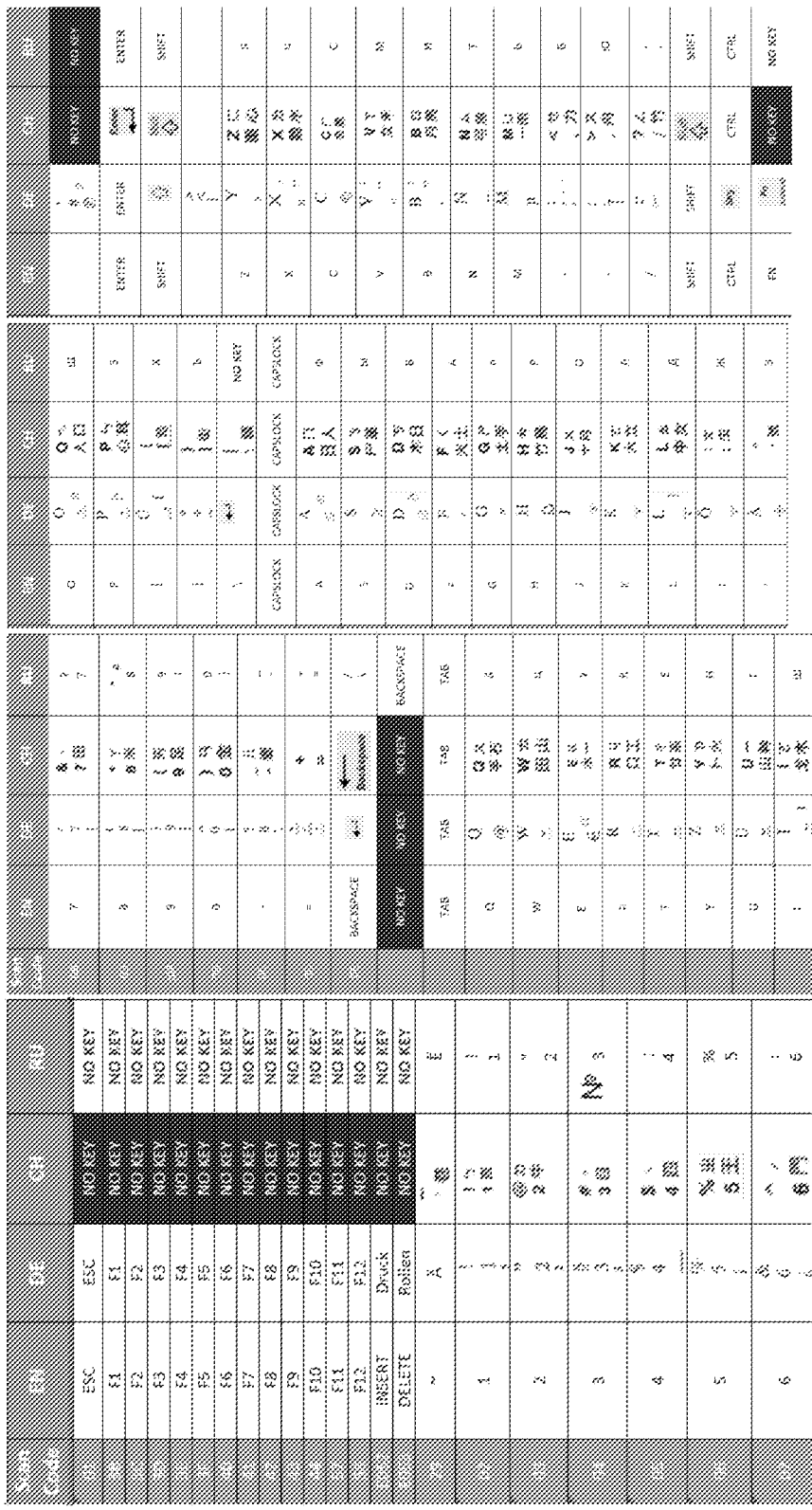

FIGS. 5-7 further illustrate language implementation, according to exemplary embodiments. The information handling system 100 locally stores the operating system 204 and the language-specific keyboard software algorithm 220 in the memory device 120 (illustrated in FIG. 1). The platform hardware installed within the information handling system 100 (such as the processors 102 and 104, the chipset 110, and/or the baseboard management controller explained with reference to FIG. 1) receives an electrical power 240 (such as current and voltage perhaps produced by an AC/DC power supply). When the BIOS/EFI module 142 receives the electrical power 240, the BIOS/EFI module 142 executes a power on self-test (or "POST") operation 242. As the POST operation 242 executes, the POST operation 242 may also include and execute software programming that instructs or causes the information handling system 100 to generate a visual/audible language prompt 244 (perhaps via the video display 134) for selecting the language 216 of use.

The BIOS/EFI module 142, for example, may cause the video display 134 to display a graphical language menu of different typed/written languages. The user inputs a tactile/capacitive/audible language selection 246 that selects her desired language 216 of use. The BIOS/EFI module 142 may be configured to wait a predetermined timeout (such as 5 seconds) for the user's language selection 246. If no language selection 246 is input or received, the BIOS/EFI module 142 may have a default configuration (such as a preconfigured or preferred language 216 of use, or default to a previously selected language 216 of use).

The language 216 of use may be established during the POST operation 242. Because the POST operation 242 tests the hardware resources operating within the information handling system 100, the POST operation 242 may set or configure the keyboard controller 208 according to the language 216 of use. As the user types on the keyboard 202, the keyboard 202 has a hardware processor and memory device (not shown for simplicity) that identifies the scancode 206 that corresponds to the depressed key 210. The keyboard 202 sends or conveys the scancode 206 to the information handling system 100. The keyboard controller 208 may then interpret the scancode 206, according to the language 216 of use.

The language 216 of use may alternatively be established during an execution of the operating system 204. When the hardware resources successfully pass the POST operation 242, the information handling system 100 performs a boot operation and launches/executes the operating system 204. As the operating system 204 executes, the language-specific keyboard software algorithm 220 may instruct or cause the information handling system 100 to generate the visual/audible language prompt 244 (perhaps via the video display 134) for selecting the language 216 of use. The language-specific keyboard software algorithm 220 may cause the video display 134 to display a graphical language menu of different typed/written languages. The user may optionally enter a menu command that instructs or causes the language-specific keyboard software algorithm 220 to display the graphical language menu. However or whenever the graphical language menu is presented, the user inputs the language selection 246, and the language-specific keyboard software algorithm 220 switches and configures according to her desired language 216 of use.

The language-specific keyboard software algorithm 220 may be configured to wait a predetermined timeout (such as 5 seconds) for the user's language selection 246. If no language selection 246 is input or received, the language-specific keyboard software algorithm 220 may have a default configuration (such as a preconfigured or preferred language 216 of use, or default to a previously selected language 216 of use). The language-specific keyboard software algorithm 220 may configure, and/or cooperate with, the keyboard controller 208 according to the language 216 of use. As the user types on the keyboard 202, the keyboard 202 has a hardware processor and memory device (not shown for simplicity) that identifies the scancode 206 that corresponds to the depressed key 210. The keyboard 202 sends or conveys the scancode 206 to the information handling system 100. The keyboard controller 208 may then interpret the scancode 206, according to the language 216 of use.

Exemplary embodiments may consult a universal language character database (or "LCD") 250. The POST operation 242, and/or the operating system 204, interfaces with the keyboard controller 208, and with the language-specific keyboard software algorithm 220, to define the assignments of the keys 210 and their corresponding scancodes 206 to the language-specific characters 212. For example, the information handling system 100 may query the language character database 250 for the language 216 of use. The language character database 250 defines relationships between each language 216 of use, its language-specific characters 212, and the scancodes 206 that correspond to the keys 210 for each language-specific characters 212. While the language character database 250 may have any configuration or construction, a relational database is perhaps easiest to understand.

FIGS. 6-7 thus illustrate the language character database (LCD) 250 as a table having columnar/row entries that map, relate, or associate each language 216 of use to its corresponding language-specific characters 212 and to each key's scancode 206. Exemplary embodiments may query the language character database 250 for any query parameter and perform a database lookup for the corresponding entry/entries. The information handling system 100 (such as the POST operation 242, the operating system 204, and/or the keyboard controller 208) may identify and fetch any language-specific character 212 that is defined for the language 216 of use, along with its associated scancode 206. Exemplary embodiments may quickly and easily query the language character database 250 to identify which of the corresponding language-specific characters 212 was typed.

The ITO traces 232 may also be defined. Once the information handling system 100 determines the language-specific characters 212 and the scancodes 206, the information handling system 100 may assign that character data to the respective keyboard overlay ITO trace 232 (defined by its respective X-Y coordinates). That is, the information handling system 100 may consult a database mapping of different languages 216 of use to their corresponding scancodes 206 and to the ITO traces 232. Once any scancode 206 is received or identified, exemplary embodiments may immediately associate the particular scancode 206 to its corresponding ITO trace 232. Indeed, once the user selects the desired language 216 of use, exemplary embodiments may immediately identify the corresponding scancodes 206, the ITO traces 232, and their respective X-Y coordinates that are predefined for the language 216 of use. So, when the keyboard 202 sends any scancode 206, the information handling system 100 may quickly and easily identify the corresponding key 210, the corresponding language-specific character 212, the corresponding ITO trace 232, and the corresponding X-Y coordinates associated with the keyboard overlay 230, all according to the user's language 216 of use.

The information handling system 100 may instruct the video display 134 to generate and to display the language-specific character 212, in response to the receipt of the scancode 206. The information handling system 100 may also send a command or instruction (perhaps via the keyboard controller 208) to the keyboard overlay 230 to provide the electrical power 240 to the corresponding ITO trace 232, thereby illuminating the corresponding key 210 and/or the corresponding language-specific character 212, again in response to the receipt of the scancode 206. To the user, then, the language-specific character 212 is displayed and illuminated, seemingly in response to her finger depression of the key 210. The information handling system 100 thus ensures that all the language-specific characters 212, designated for the particular ITO trace 232, are displayed by using the layout of a standard language-specific keyboard 202. For example, if characters such as 4, $, and ₹ are printed on a normal English keyboard overlay, then all these could be illuminated on a single ITO trace 232. Exemplary embodiments thus use software programming to interpret the user's keystrokes in the language 216 of use, whether during execution of the POST operation 242 or of the operating system 204.

Exemplary embodiments are applicable or adaptable to any operating system 204. The operating system 204 manages the hardware components above described, and the operating system 204 manages software resources and services, depending on programs stored and executed by the information handling system 100. While the information handling system 100 may store and execute any version of any operating system 204, most readers are thought familiar with the well-known family of the MICROSOFT® WINDOWS® graphical operating systems.

Exemplary embodiments may thus retain the attributes of the language 216 of use. Because the language 216 of use may be changed during the POST operation 242 and/or during execution of the operating system 204, the language-specific attributes remain static until a different language is selected by the user during either the POST operation 242 or the operating system 204. For example, if the keyboard overlay 230 is currently operating in a German-language, then the keyboard assignments will remain German-based until the user selects a different language at the POST level or at the OS level.

Exemplary embodiments may thus be very helpful in shared environments. As the reader likely understands, the information handling system 100 may be shared by multiple users. A family, for example, may have a single computer that is shared for use by family and friends. A company or employer may similarly have a central computer or terminal that is shared for use by team members. Some family members, and some team members, may be more comfortable typing in preferred languages. Exemplary embodiments thus allow any of the users to switch the language of use and to type using the corresponding language-specific characters 212. Any user need only call up the menu of languages (such as generating the language prompt 244 illustrated in FIG. 5), switch to the user's preferred language 216 of use, and type using the corresponding language-specific characters 212.

Exemplary embodiments provide multi-language typing capabilities. Users who want to type in a different language will select their chosen language 216 of use, perhaps at the POST level or at the OS level from the taskbar. Different language-specific overlay keyboards 230 (perhaps with tactile or high contrast effect) may thus be mated to a single design for the physical keyboard 202. Exemplary embodiments may also be adapted for visually impaired users with a single design for the physical keyboard 202. The language-specific keyboard software algorithm 220 (such as the KOCI engine illustrated in FIG. 6) uses a set of APIs to: detect the keyboard language selected at the POST level or at the OS level by using a GET call; query the language character database (LCD) 250 to fetch matching characters and associated scancodes 206; assign that character data to the respective ITO 232 (defined by their respective X-Y co-ordinates) by using the scancodes 206; and ensure that all characters designated for a particular ITO Trace 232 are displayed by using the layout of a standard language-specific keyboard 202. The language-specific keyboard software algorithm 220 (such as the KOCI engine illustrated in FIG. 6) runs APIs to detect the language 216 of use, and then perform 'GET' and 'POST' operations to assign keyboard characters to respective ITO-traces based on the scancodes 206.

Multilinguists, translators, and language service providers can easily change the keyboard layout by changing the language of the OS 204. It also augments the real-life scenario where the person typing language-specific characters 212 using the overlay keyboard 232 will see the visual reference of the characters in that specific language. Employees/Users of international teams may easily switch to any language. With the modern shift in technology, globalization, and an ever-emerging versatile working style and definition, the number of users who are working on more than one language has increased many folds.

Exemplary embodiments thus vastly improve computer functioning. The information handling system 100 may dynamically switch between different written/typed languages using software-defined relationships between the keys 210, their scancodes 206, the language-specific characters 212, and the ITO traces 232. The single keyboard 202 may be manufactured and shipped worldwide, regardless of the user's chosen language 216 of use. Exemplary embodiments thus eliminate the costs and logistics supporting different keyboards for different languages (for example, language-specific keyboards for Arabic, Chinese, Danish, French, etc.). These conventional solutions are expensive to manufacture and to ship/distribute. These conventional solutions are also expensive for customers, as multiple keyboards and overlays are required for diverse user/service/engineering groups.

The keyboard overlay 230 may display multilingual textual layouts based on the typing language selected during the post operation 242 or selected in the OS 204. Exemplary embodiments are thus a next-gen methodology that allows software-driven display of multilingual characters on the keyboard overlay 230. The language-specific keyboard software algorithm 220 (such as the KOCI illustrated in FIG. 6) may be installed to transform an overlay into a multilingual keyboard. The single keyboard overlay 230 replaces the need to plug-in and plug-out multiple language-specific keyboards. Exemplary embodiments also provides experiences similar to a user-friendly keyboard that is suitable even for large-scale transliteration efforts by translators and language service providers globally. Exemplary embodiments provide a visual reference of the characters and their layout irrespective of the language selected.

Figure 8:
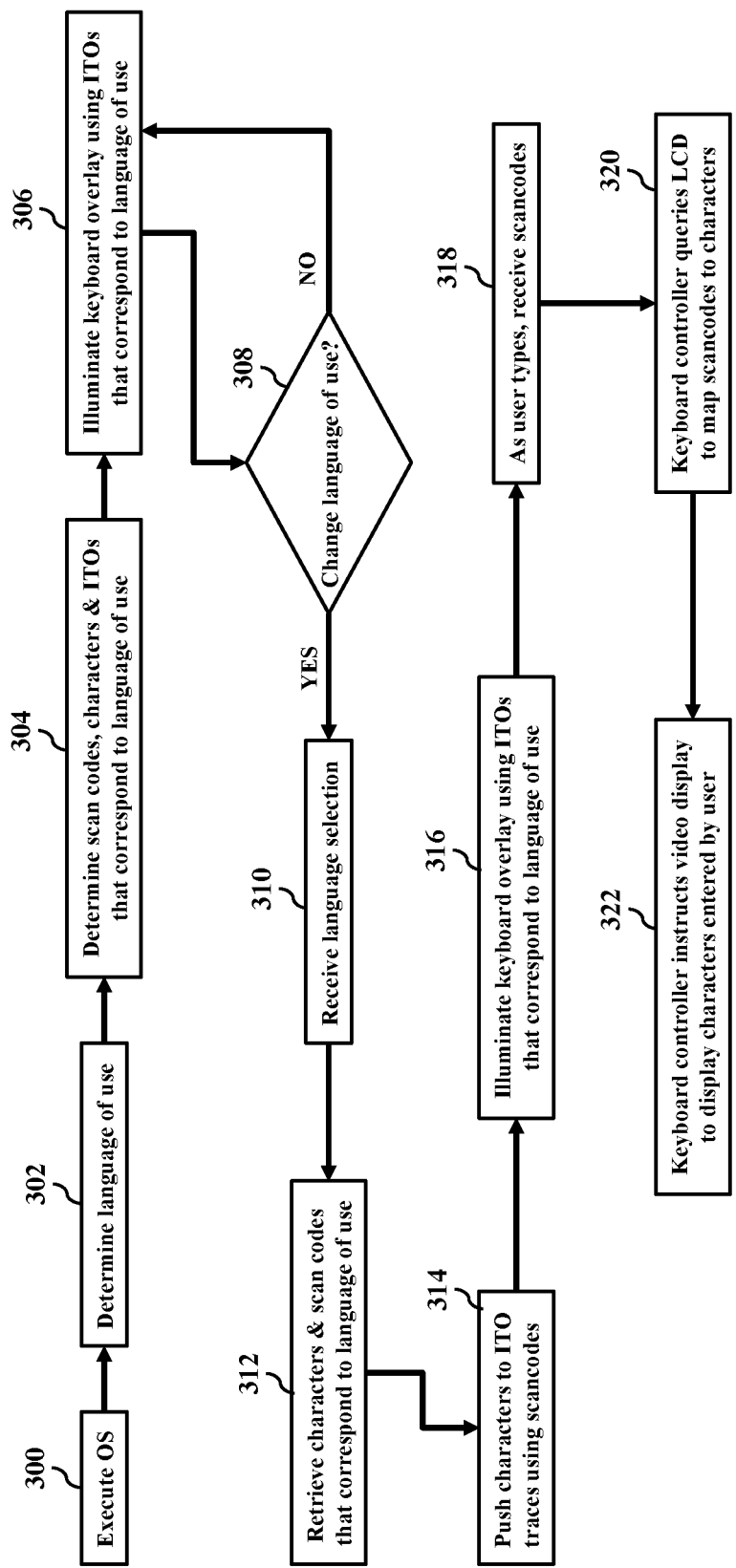
FIGS. 8-9 are flowcharts showing methods executed by the information handling system, illustrating language-specific typing characters, according to exemplary embodiments.

FIG. 8 shows a flowchart or algorithm, executed by the information handling system 100, illustrating language-specific typing characters, according to exemplary embodiments. When the information handling system 100 receives the electrical power 240, the information handling system 100 performs the POST operation 242, boots, and executes the operating system 204 (Block 300). The default configuration for the language 216 of use is used to map the scancodes 206 to their (Block 302). The language-specific characters 212 and the scancodes 206 associated with the language 216 of use are determined (Block 304) and the keyboard overlay 230 is illuminated according to the language-specific characters 212 (Block 306). However, if the user wishes to change the language 216 of use (Block 308), the language selection 242 is received (Block 310) and the language character database 250 is queried to retrieve the corresponding language-specific characters 212 and scancodes 206 (Block 312).

APIs are used, for example by the keyboard controller 208, to push or send the language-specific characters 212 to the respective ITO traces 232 using the scancodes 206 (Block 314). The keyboard overlay 230 is illuminated according to the language-specific characters 212 (Block 316). As the user types on the keyboard 202, the information handling system 100 receives the scancodes 206 send from the keyboard 202 (Block 318). The language character database (LCD) 250 is queried to map the scancodes 206 to their corresponding language-specific characters 212 (Block 320). The keyboard controller 208 commands the video display to generate the language-specific characters 212 as typed by the user (Block 322).

Figure 9:
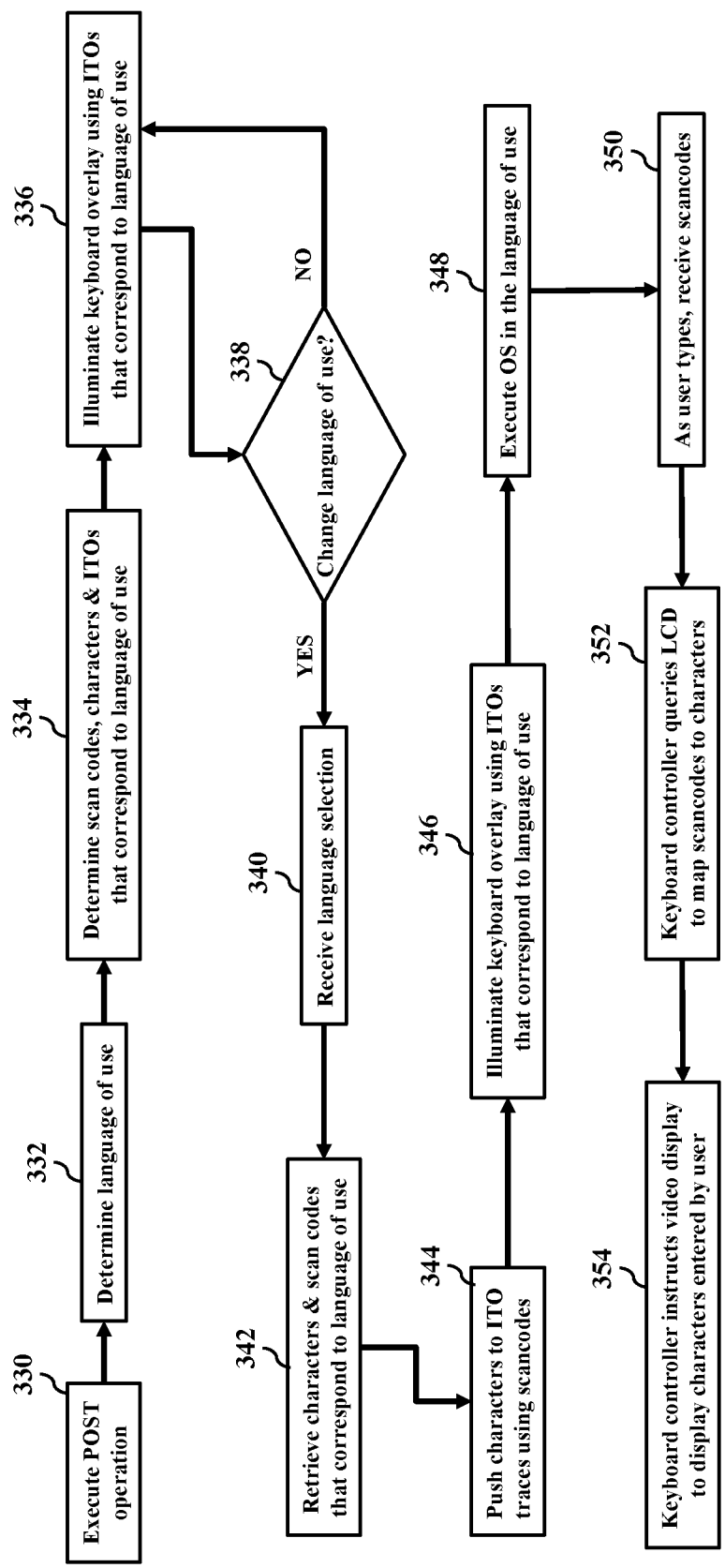

FIG. 9 is another flowchart or algorithm, executed by the information handling system 100, illustrating language-specific typing characters. The language 216 of use may be changed during the POST operation 242. When the information handling system 100 receives the electrical power 240, the information handling system 100 performs the POST operation 242 (Block 330). The default configuration for the language 216 of use is determined (Block 332) and the scancodes 206 and their corresponding language-specific characters 212 are retrieved (Block 334). The keyboard overlay 230 is illuminated according to the language-specific characters 212 (Block 336). However, the user may change the language 216 of use during the POST operation 242 (Block 338). When the language selection 242 is received (Block 340), the language character database 250 is queried to retrieve the corresponding language-specific characters 212 and scancodes 206 (Block 342).

APIs are used, for example by the keyboard controller 208, to push or send the language-specific characters 212 to the respective ITO traces 232 using the scancodes 206 (Block 344). The keyboard overlay 230 is illuminated according to the language-specific characters 212 (Block 346). When the POST operation 242 successfully completes, the information handling system 100 perform the boot procedure and executes the OS 204 in the language 216 of use (Block 348). Because the language 216 of use was set during the POST operation 242, the keyboard overlay 230 is already illuminating the language-specific characters 212 in the language 216 of use (see Block 346). The user may thus immediately type on the keyboard 202 in the language 216 of use, and the information handling system 100 receives the scancodes 206 send from the keyboard 202 (Block 350). The language character database (LCD) 250 is queried to map the scancodes 206 to their corresponding language-specific characters 212 (Block 352). The keyboard controller 208 commands the video display to generate the language-specific characters 212 as typed by the user (Block 354).

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method that implements a language of use of multiple languages supported by an operating system, the method comprising:
   executing, by an information handling system, the operating system;
   during the executing of the operating system, determining the language of use for a typed input to an overlay keyboard;
   determining a plurality of scancodes sent from the overlay keyboard representing the typed input;
   querying a universal language character (ULC) database for the scancodes sent from the overlay keyboard, the ULC database having database entries that associate the multiple languages supported by the operating system to language-specific characters and to the scancodes;
   identifying for each entry of the entries in the ULC database that associates the scancodes sent from the overlay keyboard a particular corresponding language-specific character associated with the language of use;
   in response to a particular scancode sent from the overlay keyboard, instructing a display device to display the corresponding language-specific character associated with the language of use; and
   in response to determining the plurality of scancodes, sending an illumination instruction to a keyboard overlay overlain on the overlay keyboard, the illumination instruction causing the keyboard overlay to illuminate the language-specific characters corresponding to the scancodes.

2. The method of claim 1, further comprising determining a trace associated with the scancode sent from the overlay keyboard.

3. The method of claim 1, further comprising determining a trace associated with the language-specific character.

4. The method of claim 1, further comprising illuminating the language-specific character.

5. The method of claim 1, further comprising receiving, during the executing of the operating system, a language selection input to the overlay keyboard that selects a different language of use.

6. The method of claim 5, further comprising replacing the language-specific character associated with the language of use with a different language-specific character associated with the different language of use.

7. The method of claim 1, wherein, in illuminating the language-specific characters corresponding to the scancodes, the method further comprising illuminating a number of keys of the keyboard overlay that is less than a total number of keys of the keyboard overlay.

8. A system that implements a language of use of multiple languages supported by an operating system, the system comprising:
   a hardware processor; and
   a memory device storing instructions that when executed by the hardware processor perform operations, the operations including:
      during an execution of an operating system, determining the language of use for a typed input to an overlay keyboard;
      determining a plurality of scancodes sent from the overlay keyboard representing the typed input;
      querying a universal language character (ULC) database for the scancodes, the ULC database having database entries that associate the multiple languages supported by the operating system to the scancodes and to language-specific characters associated with each language of the multiple languages;
      identifying for each entry of the entries in the ULC database that associates the scancodes sent from the overlay keyboard a particular corresponding language-specific character associated with the language of use;
      in response to a particular scancode sent from the keyboard, instructing a display device to display the corresponding language-specific character associated with the language of use; and in response to determining the plurality of scancodes, sending an illumination instruction to a keyboard overlay overlain on the overlay keyboard, the illumination instruction causing the keyboard overlay to illuminate the language-specific characters corresponding to the scancodes.

9. The system of claim 8, wherein the operations further include determining a trace associated with the scancode sent from the overlay keyboard.

10. The system of claim 8, wherein the operations further include determining a trace associated with the language-specific character.

11. The system of claim 8, wherein the operations further include illuminating the language-specific character.

12. The system of claim 8, wherein the operations further include executing a power-on self-test operation prior to the executing of the operating system.

13. The system of claim 12, wherein the operations further include receiving, during the executing of the power-on self-test operation, a language selection input to the overlay keyboard that selects the language of use.

14. The system of claim 8, wherein, in illuminating the language-specific characters corresponding to the scancodes, the operations further include illuminating a number of keys of the keyboard overlay that is less than a total number of keys of the keyboard overlay.

15. A memory device storing instructions that when executed perform operations, the operations including:

during an execution of a power-on self-test operation, receiving a selection indicating a language of use;

after a completion of the power-on self-test operation, executing an operating system according to the language of use;

determining a plurality of scancodes sent from an overlay keyboard in response to a user depressing a key;

identifying a language-specific character that corresponds to the scancodes by querying a universal language character (ULC) database, the ULC database associating the language of use of the multiple languages supported by the operating system to language-specific characters and to the scancodes;

in response to the scancode sent from the overlay keyboard, commanding a display device to display the language-specific character associated with the language of use; and in response to determining the plurality of scancodes, sending an illumination instruction to a keyboard overlay overlain on the overlay keyboard, the illumination instruction causing the keyboard overlay to illuminate the language-specific characters corresponding to the scancodes.

16. The memory device of claim 15, wherein, in illuminating the language-specific characters corresponding to the scancodes, the operations further include illuminating a number of keys of the keyboard overlay that is less than a total number of keys of the keyboard overlay.

\* \* \* \* \*